3,030,378
FIVE-MEMBERED N-HETEROCYCLIC GUANIDINES

Robert Paul Mull, Florham Park, N.J., assignor to Ciba Pharmaceutical Products, Inc., Summit, N.J., a corporation of New Jersey
No Drawing. Filed May 29, 1959, Ser. No. 816,668
6 Claims. (Cl. 260—313)

The present invention concerns guanidine derivatives. More particularly, it relates to $R_1$-lower alkyl-guanidines, in which $R_1$ stands for an N-pyrryl radical, and the salts of such compounds. Also anticipated are acyl derivatives of these $R_1$-lower alkyl-guanidines and process for the preparation thereof.

An N-pyrryl radical may be represented by the 1-pyrryl radical or an N-pyrryl radical, onto which may be fused one or two carbocyclic aryl, particularly monocyclic carbocyclic aryl, i.e. benzene, nuclei, or partially saturated carbocyclic aryl nuclei, particularly partially saturated monocyclic carbocyclic aryl, e.g. tetrahydro-benzene nuclei. Such fused bicyclic or tricyclic N-pyrryl radicals are, therefore, primarily N-benz[b]pyrryl, i.e. 1-indolyl, N-dibenz[b,d]pyrryl, i.e. 9-carbazolyl, N-benz[b]tetrahydrobenz[d]pyrryl or 9-tetrahydro-carbazolyl radicals, and the like.

Other rings, which may be fused onto the pyrryl radical, may also be heterocyclic aryl, particularly monocyclic heterocyclic aryl, nuclei, such as, for example, pyridine, or partially saturated heterocyclic aryl, particularly partially saturated monocyclic heterocyclic aryl nuclei, such as, for example, tetrahydropyridine. Such bicyclic and tricyclic ring systems may be represented by N-7-azaindolyl, 9-β-carbolinyl or 9-γ-carbolinyl, in which any secondary ring nitrogen atom may be substituted, for example, by lower alkyl, e.g. methyl.

The radicals $R_1$ may contain as further substituents lower alkyl groups, e.g. methyl or ethyl, hydroxyl (which may substitute, for example, N-indolyl groups) or lower alkoxy, e.g. methoxy or ethoxy, and the like.

The lower alkyl radical, connecting the guanidino group with the nitrogen atom of the pyrryl portion may be represented by a lower alkylene radical containing from one to five carbon atoms, preferably from two to three carbon atoms. Furthermore, the guanidino group may advantageously be separated from the pyrryl nucleus by two to three carbon atoms. The preferred lower alkylene radicals are, therefore, 1,2-ethylene, 1-methyl-1,2-ethylene, 2-methyl-1,2-ethylene or 1,3-propylene; other lower alkylene radicals are, for example, methylene, 1,1-ethylene, 1,4-butylene or 1,5-pentylene and the like.

The guanidino group contains, preferably, no additional substituents; if substituted, the nitrogen atoms of the amino and/or imino groups may contain lower alkyl, e.g. methyl or ethyl groups. Substituted guanidino groups are, therefore, N-monomethyl-, N-polymethyl-, N-monoethyl- or N-polyethyl-guanidino groups.

Salts of the compounds of this invention are particularly therapeutically acceptable acid addition salts with inorganic acids, such as mineral acids, e.g. hydrochloric, hydrobromic, sulfuric or phosphoric acids, or with organic acids, such as formic, acetic, propionic, glycolic, lactic, pyruvic, malonic, succinic, maleic, hydroxymaleic, dihydroxymaleic fumaric, malic, tartaric, citric, salicylic, methane sulfonic, ethane sulfonic, or 2-hydroxyethane sulfonic acid.

The new guanidine compounds of this invention may also form quaternary ammonium compounds, particularly those with lower alkyl halides, e.g. methyl, ethyl, propyl or isopropyl chloride, bromide or iodide, as well as the corresponding quaternary ammonium hydroxides and the salts which may be formed from the quaternary ammonium hydroxides by the reaction with inorganic acids other than the hydrohalic acids or with organic acids, such as those outlined above for the preparation of the acid addition salts.

Acyl derivatives of the new guanidine compounds of this invention are those formed with organic acids, particularly organic carboxylic acids, such as lower aliphatic carboxylic acids, for example, lower alkanoic acids, e.g. acetic, propionic or pivalic acid, substituted lower alkanoic acids, e.g. chloroacetic dichloroacetic, hydroxyacetic, methoxyacetic or cyclopentylpropionic acid, or lower alkenoic acids, e.g. acrylic acid, with carbocyclic aryl carboxylic acids, for example, monocyclic carbocyclic aryl carboxylic acids, e.g. benzoic, hydroxybenzoic or aminobenzoic acid, or bicyclic carbocyclic aryl carboxylic acids, e.g. 1-naphthoic or 2-naphthoic acid, with carbocyclic aryl-lower aliphatic hydrocarbon carboxylic acids, such as monocyclic, carbocyclic aryl-lower alkanoic acids, e.g. phenyl-acetic or phenylpropionic acid, or with heterocyclic aryl carboxylic acids, for example, monocyclic heterocyclic aryl carboxylic acids, e.g. nicotinic, isonicotinic or 2-furoic acid.

The compounds of the present invention exhibit valuable pharmacological properties, and may, therefore, be used as pharmaceutical reagents. Thus, they may exhibit antihypertensive properties, and may, therefore, be used in the treatment of experimental or clinical hypertension.

A particular characteristic of this antihypertensive property may be its long duration, which is especially useful in the treatment of chronic hypertensive conditions. The compounds of this invention may also show anticholinergic effects, which may be useful to overcome spastic conditions, analgesic properties, which may counteract pain associated with chronic diseases or minor or major surgery, or antihistaminic effects, which may be utilized to offset the effects of histamine in allergic disorders. They may also have antibacterial activities, and may, therefore, be used accordingly; they may also serve as intermediates for the preparation of valuable compounds.

The new compounds of this invention may be used as medicaments in the form of pharmaceutical preparations, which contain the new guanidine derivatives or the salts thereof in admixture with a pharmaceutical organic or inorganic, solid or liquid carrier suitable for enteral or parenteral administration. For making up the preparations there can be employed substances which do not react with the new compounds, such as water, gelatine, lactose, starches, stearic acid, magnesium stearate, stearyl alcohol, talc, vegetable oils, benzyl alcohols, gums, propylene glycol polyalkylene glycols or any other known carrier for medicaments. The pharmaceutical preparations may be in solid form, for example, as capsules, tablets or dragees, or in liquid form, for example, as solutions, e.g. isotonic saline solutions, or as suspensions or emulsions. If desired, they may contain auxiliary substances such as preserving, stabilizing, wetting or emulsifying agents, salts for varying the osmotic pressure or buffers. They may also contain, in combination, other therapeutically useful substances.

The new compounds of the present invention may be prepared by reacting a $R_1$-lower alkyl-amine, in which $R_1$ has the previously-given meaning, or a salt thereof, with a reagent capable of converting the amino group into a guanidino group, and, if desired, converting a resulting salt into a free compound, and/or, converting a resulting compound into its acyl derivative, and/or, if desired, converting a free compound into a salt thereof.

A reagent capable of converting an amino group into a guanidino group is primarily an S-lower alkyl-thiourea, or more advantageously, an acid addition salt thereof. Such acid addition salts are primarily those with inorganic acids, particularly mineral acids, e.g. hydrochloric, hydrobromic, or especially, sulfuric acid. The lower alkyl group in the S-lower alkyl-isothiourea may stand for ethyl, n-propyl and the like, but represents primarily methyl. The nitrogen atoms of the isothiourea derivatives may be otherwise unsubstituted, or the amino and/or imino group of these reactants may be substituted by lower hydrocarbon radicals, such as lower alkyl, e.g. methyl or ethyl; such N-substituted isothiourea compounds provide for the formation of guanidine compounds in which the amino and/or imino groups of the guanidino portion are substituted. The preferred reagent to convert amino groups into N-unsubstituted guanidino groups is S-methyl-isothiourea sulfate.

The S-lower alkyl-isothiourea, or the salts thereof, may be replaced by O-lower alkyl-isoureas, in which lower alkyl has the above-given meaning and stands primarily for methyl, or salts, particularly mineral acid addition salts thereof.

The reaction of the $R_1$-lower alkyl-amine with these reagents is carried out by contacting the two starting materials, preferably in the presence of a solvent, the choice of which depends primarily on the solubility of the reactants. Water or water-miscible organic solvents, such as lower alkanols, e.g. methanol, ethanol, propanol, isopropanol or tertiary butanol, ethers, e.g. p-dioxane, ketones, e.g. acetone or ethyl methyl ketone, lower alkanoic acids, e.g. acetic acid, formamides, e.g. dimethylformamide, or aqueous mixtures of such solvents may be used as solvents. The reaction may be carried out at room temperature, or, if necessary, at an elevated temperature, for example, at the boiling temperature of the solvent. An absence of oxygen may be achieved by performing the reaction in the atmosphere of an inert gas, e.g. nitrogen, and, if necessary, it may be carried out under pressure in a closed vessel.

The starting materials used in the above reaction are known, or, if new, may be prepared according to procedures described in the prior art and used for the manufacture of known analogs. Thus, S-lower alkyl-isothioureas or O-lower alkyl-isoureas may be prepared, for example, by alkylating thioureas or ureas, in which at least one of the nitrogen atoms carries a hydrogen atom, with a lower alkyl halide, e.g. methyl or ethyl chloride, bromide or iodide, or with a di-lower alkyl-sulfate, e.g. dimethyl sulfate or diethyl sulfate.

The $R_1$-lower alkyl-amines, in which $R_1$ has the above-given meaning, and the amino group represents particularly a primary amino group, but may also stand for a secondary amino group, such as an N-lower alkyl-amino, e.g. methylamino or ethylamino, group, may be prepared, for example, by treating a pyrrol compound of the formula $R_1$—H, preferably in the form of an alkali metal, e.g. lithium, sodium or potassium, salt thereof, with a halogeno-lower alkyl nitrile, and converting in a resulting $R_1$-lower alkyl nitrile the nitrile group to a methylene-amino group by catalytic hydrogenation, such as, by treatment with hydrogen in the presence of a catalyst containing a metal of the eighth group of the periodic system, e.g. palladium on charcoal or Raney nickel, or, preferably, by treatment with a light metal hydride, for example, an aluminum hydride, such as lithium aluminum hydride, sodium aluminum hydride, magnesium aluminum hydride, aluminum borohydride or aluminum hydride, which hydrides may be used, if desired, in the presence of an activator, such as aluminum chloride.

The amino group in a $R_1$-lower alkyl-amine may also be converted into a guanidino group by treatment of the amine with a salt of a 1-guanyl-pyrazole derivative, for example, the nitrate of 1-guanyl-3,5-dimethyl-pyrazole. Although the reaction may proceed without the presence of a solvent, a lower alkanol, e.g. ethanol, may be used as a diluent. The reaction is preferably carried out at an elevated temperature; in the absence of a solvent, the two reactants may be fused together at an elevated temperature.

Furthermore, the $R_1$-lower alkyl-amine may be converted into the desired $R_1$-lower alkyl guanidine compound by treating a mineral acid addition salt, e.g. hydrochloride or sulfate, of the starting material with cyanamide, if desired, in an aqueous or a lower alkanol, e.g. methanol or ethanol, solution, or by fusing the two reactants at an elevated temperature.

Acyl derivatives of the guanidine compounds of the present invention may be prepared, for example, by treating a resulting guanidine compound with the reactive derivative of a carboxylic acid, for example, with a halide, e.g. chloride, or with the anhydride of a carboxylic acid. The reaction is preferably carried out in an inert solvent, for example, in a hydrocarbon, such as an aliphatic hydrocarbon, e.g. hexane, or an aromatic hydrocarbon, e.g. benzene, toluene or xylene, or in a tertiary organic base, such as a liquid pyridine compound, e.g. pyridine or collidine.

Depending on the conditions used, the new guanidine compounds may be obtained in the form of the free compounds or as the salts thereof. A salt may be converted into the free compound in the customary way, for example, by treatment with an aqueous alkaline reagent, such as an alkali metal hydroxide, e.g. lithium, sodium or potassium hydroxide, an alkali metal carbonate, e.g. lithium, sodium or potassium carbonate or hydrogen carbonate, or ammonia. A free base may be transformed into its therapeutically useful acid addition salts by reacting the former with an appropriate inorganic or organic acid, such as one of those outlined hereinabove, preferably in the presence of a solvent, such as a lower alkanol, e.g. methanol, ethanol, propanol or isopropanol, or an ether, e.g. diethylether or p-dioxane, and the like or in a mixture of solvents.

The guanidine compounds may be converted into the quaternary ammonium compounds by reacting tertiary bases with an ester formed by a hydroxylated lower hydrocarbon compound with a strong inorganic or organic acid. Hydroxylated lower hydrocarbon compounds contain from 1 to 7 carbon atoms and the esters thereof are more especially those with mineral acids, e.g. hydrochloric, hydrobromic, hydriodic, or sulfuric acid. Such esters are specifically lower alkyl halides, e.g. methyl, ethyl or n-propyl chloride, bromide or iodide, or lower alkyl lower alkane sulfonates, e.g. methyl or ethyl methane or ethane sulfonate. The quaternizing reaction may be performed in the presence or absence of a solvent, at room temperature or under cooling, at atmospheric pressure or in a closed vessel under pressure. Suitable solvents are more especially lower alkanols, e.g. methanol, ethanol, propanol, isopropanol, tertiary butanol or pentanol, lower alkanones, e.g. acetone or ethyl methyl ketone, or organic acid amides, e.g. formamide or dimethylformamide.

The invention also comprises any modification of the general process wherein a compound obtainable as an intermediate at any state of the process is used as starting material and the remaining step(s) of the process is (are) carried out, as well as any new intermediates.

In the process of this invention such starting materials are preferably used which lead to final products mentioned in the beginning as preferred embodiments of the invention.

The following examples illustrate the invention and are not to be construed as bing limitations thereon. Temperatures are given in degrees centigrade.

*Example 1*

A mixture of 6.7 g. of pyrrole and 7.6 g. of chloroacetonitrile in 75 ml. of benzene, containing 5.3 g. of anhydrous sodium carbonate, is stirred and refluxed for four hours. The solid material is filtered off, the filtrate is concentrated and the residue distilled to yield the desired (1-pyrryl)-acetonitrile. The latter, dissolved in ether, is converted to 2-(1-pyrryl)-ethylamine by treatment with lithium aluminum hydride.

A mixture of 1.5 g. of 2-(1-pyrryl)-ethylamine and 2 g. of S-methyl-isothiourea sulfate in a small amount of water is refluxed for four hours; upon concentrating the solution the 2-(1-pyrryl)-ethyl-guanidine sulfate precipitates.

*Example 2*

By replacing in Example 1 the pyrrole by 11.7 g. of indole, reacting the latter with 7.6 g. of chloroacetonitrile in the presence of sodium carbonate, reducing the resulting 1-indolylacetonitrile to the 2-(1-indolyl)-ethylamine by treatment with lithium aluminum hydride and treating the 2-(1-indolyl)-ethylamine with S-methyl isothiourea sulfate, the desired 2-(1-indolyl)-ethyl-guanidine sulfate can be obtained.

*Example 3*

The mixture of 2 g. of 2-(3-methyl-1-indolyl)-ethylamine and 1.6 g. of S-methyl-isothiourea sulfate in water, when refluxed for four hours, yields the desired 2-(3-methyl-1-indolyl)-ethyl-guanidine sulfate upon concentrating the reaction solution.

The starting material may be prepared according to the procedure outlined in Example 1; the 3-methyl-indole, when reacted with chloroacetonitrile in the presence of sodium carbonate, yields the 3-methyl-1-indolyl-acetonitrile, which upon treatment with lithium aluminum hydride in diethyl ether yields the desired 2-(3-methyl-1-indolyl)-ethylamine.

What is claimed is:

1. A member selected from the group consisting of $R_1$-lower alkyl-guanidine, in which $R_1$ stands for a member selected from the group consisting of 1-pyrryl, 1-indolyl and 3-methyl-1-indolyl, and therapeutically useful acid addition salts thereof.

2. 1-pyrryl-lower alkyl-guanidine, in which lower alkyl separates the pyrryl portion from the guanidino group by two to three carbon atoms.

3. 2-(1-pyrryl)-ethyl-guanidine.

4. 1-indolyl-lower alkyl-guanidine, in which lower alkyl separates the indolyl portion from the guanidino group by two to three carbon atoms.

5. 2-(1-indolyl)-ethyl-guanidine.

6. 2-(3-methyl-1-indolyl)-ethyl-guanidine.

References Cited in the file of this patent

UNITED STATES PATENTS

| | | |
|---|---|---|
| 1,805,889 | Schoeller | May 19, 1931 |
| 2,687,414 | Cusic | Aug. 24, 1954 |